UNITED STATES PATENT OFFICE.

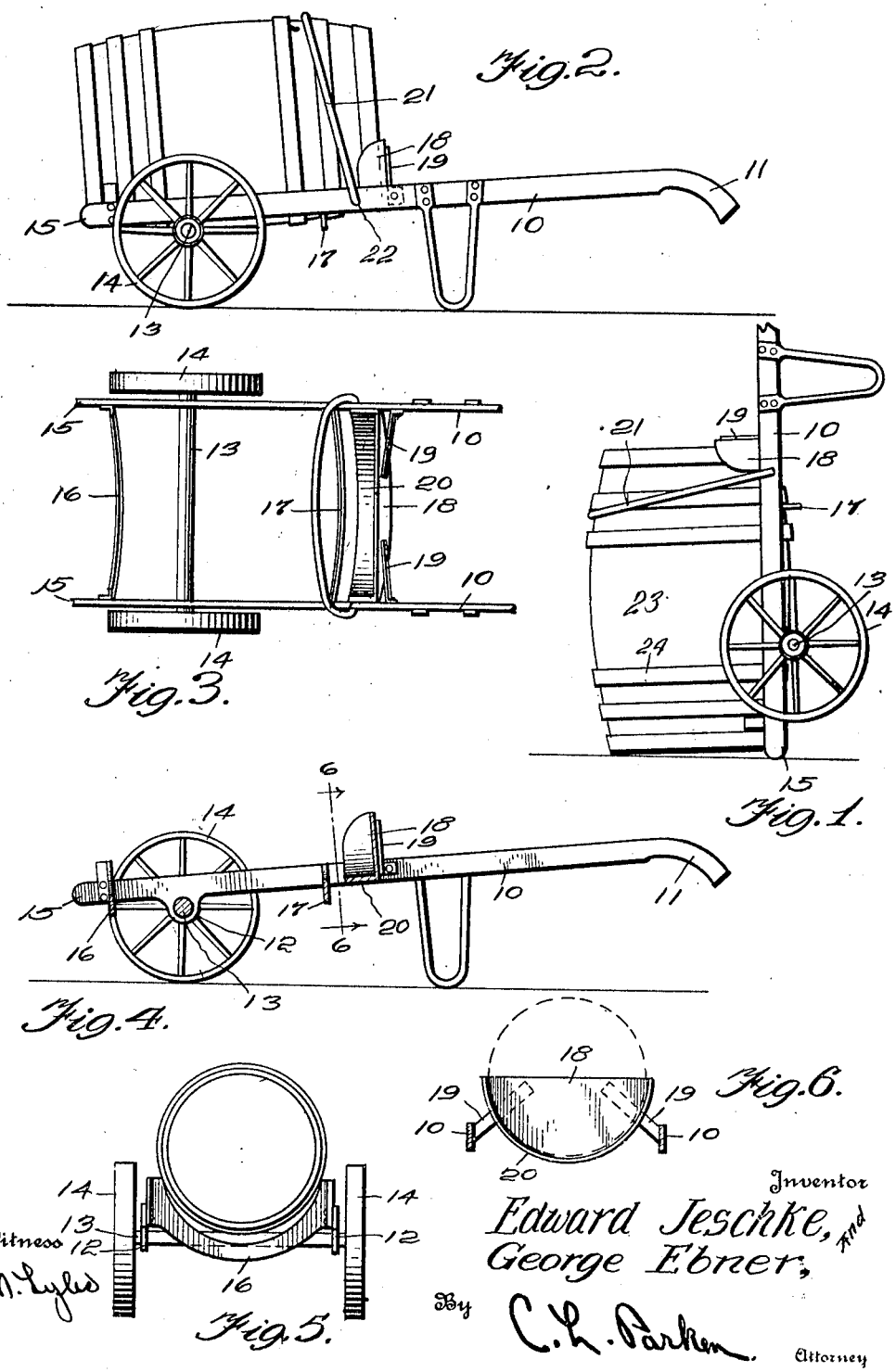

GEORGE EBNER AND EDWARD JESCHKE, OF BELLEVUE, OHIO; SAID EBNER ASSIGNOR TO SAID JESCHKE.

HAND-TRUCK.

1,313,883.   Specification of Letters Patent.   Patented Aug. 26, 1919.

Application filed November 15, 1917. Serial No. 202,202.

*To all whom it may concern:*

Be it known that we, GEORGE EBNER and EDWARD JESCHKE, citizens of the United States, residing at Bellevue, in the county of Huron and State of Ohio, have invented certain new and useful Improvements in Hand-Trucks, of which the following is a specification.

Our invention relates to improvements in hand trucks, adapted for handling barrels or the like, while not necessarily restricted to this use.

An important object of the invention is to provide means whereby the hand truck may be employed to pick up a barrel, arranged on end or in the vertical position, without liability of the truck slipping or rolling, and without subjecting the barrel or the like to undue strains.

A further object of the invention is to provide a cover or element carried by the truck, adapted to be arranged near or in contact with one end of the barrel, to prevent such end of the barrel from coming out, and the spilling of the contents thereof.

Other objects and advantages of the invention will be apparent during the course of the following description.

In the accompanying drawings forming a part of this specification and in which like numerals are employed to designate like parts throughout the same, Figure 1 is a side elevation of a truck embodying our invention, showing the same in the vertical position, Fig. 2 is a similar view of the truck in the horizontal position, Fig. 3 is a plan view of the truck, with the load or barrel removed, Fig. 4 is a central longitudinal sectional view through the same, Fig. 5 is a forward end elevation of the same, and Fig. 6 is a transverse sectional view taken on line 6—6 of Fig. 4.

In the drawings, wherein for the purpose of illustration is shown a preferred embodiment of our invention, the numeral 10 designates side bars, included in the frame of the truck. At their rear ends, these side bars are provided with handles 11. Near and spaced rearwardly for a substantial distance from the forward ends of the bars 10 are depending brackets or bearings 12, for the reception of an axle 13, carrying wheels 14, as shown.

The bars 10 are provided at their forward ends with extensions 15, which project forwardly beyond the axle 13, for a substantial distance, and forwardly beyond the wheels 14, as shown. This is an important feature of the invention, as will be more fully described.

The longitudinal bars 10 are rigidly connected by transverse elements or grips 16 and 17, which are longitudinally curved, and are arranged on edge in a substantially vertical plane. The forward grip 16 is spaced a substantial distance from the forward ends of the bars 10 or extensions 15 thereof. The function of these elements or grips will be explained hereinafter.

Arranged near and rearwardly of the element or grip 17 is a cover plate or head 18, rigidly secured to the bars 10 by brackets 19, or the like. The cover 18 is provided upon its forward side with a longitudinally curved flange 20.

The numeral 21 designates a swinging holding element or bail, the ends of which are pivotally connected with the bars 10, between the element 17 and the head 18, as shown at 22.

The operation of the truck is as follows:

In Fig. 1, a load or barrel 23 is shown vertically arranged or upon end. The truck is advanced in proximity to the side of the barrel and then swung to the vertical position, with the head 18 contacting with the upper end of the barrel and the elements 16 and 17 being arranged between the hoops 24 of the barrel. The holding element or bail 21 is now swung to the lower position, and engages the forward side of the barrel between two of the hoops. The barrel is now securely held or locked to the truck. The extensions 15 are now in contact with the floor or ground while the wheels are spaced therefrom. Attention is also called to the fact that the transverse element 16 is spaced from the ground, and is not inserted beneath the lower end of the barrel, which would require the barrel to be first slightly raised, before the barrel could be secured to the truck. When the truck is swung rearwardly slightly, the entire truck pivots upon the ends of the extensions 15 and the barrel is raised from the ground. This is ordinarily the most dangerous part of the operation, as in the ordinary truck, the wheels contact with the ground at this time, and the truck is liable to slip or roll, ordinarily forwardly. However, as the wheels are at first out of contact with the ground there is no tendency to roll. As the truck is swung rearwardly sufficiently, the wheels contact with the ground, but the truck and barrel have then been swung toward the horizontal, sufficiently, whereby the operator can conveniently handle the truck, without liability of the same slipping or rolling. The end or head 18 serves as a stop to prevent the barrel from slipping longitudinally and rearwardly upon the truck, should the truck be swung downwardly too suddenly, it being obvious that the bail 21 could not prevent the rearward movement of the barrel. The head 18 also serves as means to hold and reinforce the end of the barrel and will also prevent the spilling of the contents of the barrel, should the end thereof be partly or wholly opened. The curved grip 16 is adapted to engage between two of the rims of the barrel, and when freeing the truck from the barrel, with the barrel in a vertical position, the truck may be turned slightly upon the head 18, whereby its forward or lower end is moved away from the barrel. The bail 22 by being pivoted to the bars 10, near the head 18, permits of this slight turning movement, but also connects the truck with the barrel, preventing the separation of the truck from the barrel during this operation.

It is to be understood that the form of our invention herewith shown and described is to be taken as a preferred example of the same, and that various changes in the shape, size, and arrangement of parts may be resorted to without departing from the spirit of the invention or the scope of the subjoined claim.

Having thus described our invention, we claim:—

A hand truck of the character described, comprising a transverse axle, wheels carried by the axle, a pair of longitudinal bars arranged upon and secured to the transverse axle and projecting forwardly beyond the same and beyond the wheels for a substantial distance so that the bars raise the wheels from contact with the ground when the truck is moved to substantially a vertical position, a transverse longitudinally curved grip secured to the longitudinal bars at a point arranged near and spaced from the transverse axle and spaced from the forward ends of the longitudinal bars, said grip being adapted to engage between two rims of the barrel, a longitudinally curved strip secured to the longitudinal bars rearwardly of the wheels, a head connected with the strip and forming therewith a socket for the reception of the upper end of the barrel so that such upper end is held against rearward longitudinal displacement and may be readily released when the barrel is shifted to the vertical position, a bail pivotally connected with the longitudinal bars at a point disposed forwardly of and near said strip, said bail being adapted to encircle the upper end of the barrel to prevent displacement thereof, and allowing the truck to be turned slightly upon said head to move the forward end thereof away from the barrel so that the grip disengages from between the two rims while retaining the truck connected with the upper end of the barrel, and hand-grips secured to the rear ends of the longitudinal bars.

In testimony whereof we affix our signatures in presence of two witnesses.

GEORGE EBNER.
EDWARD JESCHKE.

Witnesses:
J. P. VICKERY,
R. R. PARKHURST.

Copies of this patent may be obtained for five cents each, by addressing the "Commissioner of Patents, Washington, D. C."